3,296,319
PARTICLE SIZE CONTROL IN FLUIDIZED
OXYCHLORINATION REACTION
Lester E. Bohl and Raymond M. Vancamp, New Martinsville, W. Va., assignors to Pittsburgh Plate Glass Company, Pittsburgh, Pa., a corporation of Pennsylvania
Filed Oct. 22, 1965, Ser. No. 502,259
5 Claims. (Cl. 260—654)

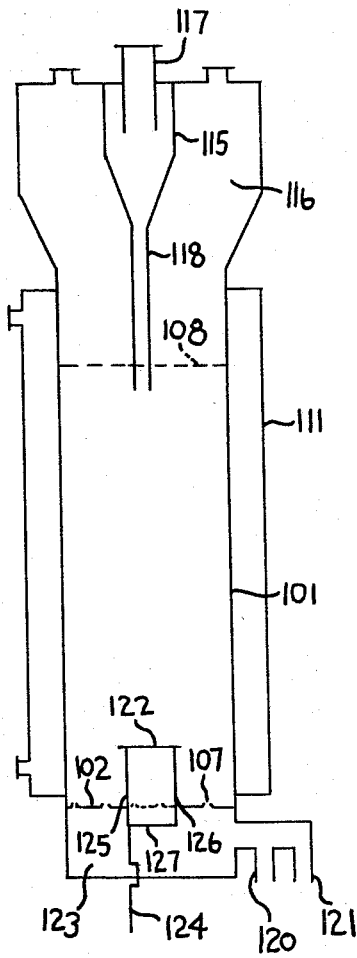

This application is a continuation-in-part of our co-pending application U.S. Serial No. 200,453, filed June 6, 1962, now abandoned, which application is a continuation-in-part of our application U.S. Serial No. 28,520, filed May 12, 1960, now abandoned.

The present invention relates to the oxychlorination of hydrocarbons and/or chlorohydrocarbons. More particularly, the present invention relates to improvements in the operation of fluid bed reactors in which oxychlorination procedures are being conducted.

In operating fluidized bed oxychlorination reactors, it has been found quite frequently that utilization of hydrocarbon and/or chlorohydrocarbon feeds and chlorinating agents employed quite frequently fall short of desirable values. In addition, it has been found that considerable quantities of hydrocarbon or chlorohydrocarbons employed as feed are frequently burned during oxychlorination reactions. Since the burning of hydrocarbon and/or chlorohydrocarbon feed material represents decreased utilization of feed, operations involving excessive burning are not particularly attractive.

In accordance with the teachings of the present invention, many of the difficulties encountered by the prior art in operating fluidized bed reactors in which oxychlorination reactions are conducted have been eliminated or substantially minimized. Thus, in accordance with the present invention, a process is provided in which oxychlorination reactions are conducted in a fluidized bed. The oxychlorination reaction is conducted in such a manner that little burning is encountered. High utilization of reactant gases is realized and the over-all operation of the fluidized bed is enhanced.

These advantages are achieved by carefully regulating the particle size of the catalyst containing particles utilized as the fluidized bed material. The particles contained in the beds are thus regulated in size to provide in the fluidized bed reaction zone a body of particles which range in size to between 30 to 60 mesh (U.S. Sieve Series). While normally some particles fall above or below this range when a catalyst bed is made up of particles falling within this range, it is an important consideration that at least 75 percent of the fluidized bed particles remain within this range. It is also an important feature of the instant invention that the fluidized bed particles in the 30 to 60 mesh range contain at least 10 percent by weight of the particles in the range of 50 to 60 mesh.

Thus, in accordance with the present invention, the proper selection of the size of the catalyst particles and the quantity of these particles which is maintained in the bed contribute to oxychlorination reactions which can be conducted with a minimum of difficulty.

The catalysts employed for conducting oxychlorination reactions are generally multivalent metal halides particularly chlorides of metals such as copper, iron, chromium, etc. Other multivalent metal salts such as phosphates, silicates and the like may be used as well as oxides of multivalent metals. The particular catalyst material employed on the carrier is not particularly germane to the instant invention and any Deacon type catalyst or oxychlorination catalyst which effectively can be utilized to conduct an oxychlorination or Deacon reaction may be employed. A particularly effective catalyst for conducting fluidized bed reactions in which oxychlorination procedures are encountered has been found to be a copper chloride-potassium chloride catalyst material impregnated on a suitable carrier.

The selection of a particular carrier for the catalyst is also variable and materials such as alumina, silica, kieselguhr, fuller's earth, etc., may be employed. A particularly effective carrier for conducting oxychlorination reactions involving fluid bed operations is "Florex," (a calcined Fuller's earth manufactured by the Floridin Corporation). A Florex catalyst impregnated with equimolar proportions of copper chloride and potassium chloride forms a preferred catalyst for conducting the fluid bed operations herein described.

Typically, catalyst particles utilized in providing the fluidized beds operated in accordance with the teachings of this invention range in size so that at least 75 percent, preferably 80 to 90 percent of the catalyst particles contained in the fluidized beds range in size between 30 to 60 mesh. In general, 70 to 85 percent of the catalyst particles in the 30 to 60 mesh size range are found to fall between 30 to 50 mesh.

A preferred range of particle sizes in the 30 to 60 mesh range employed in accordance with this invention is a catalyst charge having 4 to 8 percent in the 20 to 30 mesh size; 35 to 45 percent in the 30 to 40 mesh size; 30 to 45 percent in the 40 to 50 mesh size; and 10 to 15 percent in the 50 to 60 mesh size. During fluidization of beds containing catalyst particles of the type contemplated herein a stratification of particles occurs with the larger or coarser particles tending to concentrate at lower levels and the smaller or finer particles being predominant in number near the upper portion of the bed. The bed characteristic thus, is one of decreasing density from gas inlets to the gas outlet point at the upper level of the beds which contribute to ease of heat transfer as well as decreasing the tendency of the bed to liberate and hold large quantities of heat at the bottom of the reactor. Without the presence of the quantity of fine particles in the 50 to 60 mesh ranges required in accordance with this invention, heat dissipation in these beds is seriously impaired.

It is to be emphasized that a particularly significant feature of the instant invention is the maintenance in this 30 to 60 mesh particle size bed of at least 10 percent by weight of particles ranging in size between 50 to 60 mesh. It has been found that when less than 10 percent of the particles present in the 30 to 60 mesh catalyst employed in the fluidized bed are 50 to 60 mesh in size, a substantial reduction in the heat transfer co-efficient of the fluidized bed catalyst takes place and deleterious results in terms of excessive oxidation, corrosion of equipment, etc., are encountered. On the other hand, when the 30 to 60 mesh catalyst fluidized bed is regulated such that at least 10 percent by weight of the particles contained in the fluidized bed are in the 50 to 60 mesh range size adequate transfer of heat takes place, minimized corrosion and good utilizations are readily obtained.

The particular manner in which the catalyst material is placed upon the carrier particles may be somewhat varied and generally speaking catalyst particles are impregnated by immersion of the carrier in the solution containing the catalytic components. If desired, a catalyst containing solution may be placed on the carrier particles while rotating the carrier particles in a mixing or tumbling device and evaporating the water of solution. If desired, a fluidized bed of catalyst carrier particles may be sprayed with a catalyst solution and enough heat supplied to the bed to evaporate the water of solution.

In conducting oxychlorination reactions, various temperatures may be employed and are well known to those skilled in the art. The precise temperature conditions employed will depend upon the hydrocarbon and/or chlorohydrocarbon fed to the bed and the desired hydrocarbon chloride products. Generally speaking, fluidized oxychlorination reactions are conducted at temperatures ranging between 400° F. to 1200° F. at atmospheric conditions of pressure. Similarly, depending upon the desired hydrocarbon chlorides and the hydrocarbon materials employed and the chlorinating agent utilized recourse to various feed conditions may be had without, in any way, disturbing the efficacy of the invention herein disclosed.

For a more complete understanding of the present invention, reference is made to the accompanying drawing in which FIGURE 1 is a diagrammatic illustration of a reactor suitable for conducting the process of the present invention. In FIGURE 1 there is shown reactor 101 having a distributor plate 102 located in the bottom thereof and provided with a plurality of drilled holes or orifices 107. The reactor fluidized bed generally indicated by the numeral 108 is enclosed by the reactor walls and the walls around the reaction zone or bed are surrounded by a cooling or heat transfer jacket 111. A dust collector 115 is located in the gas space 116 above the reaction bed 108 and the collector is provided with a gas outlet 117 for removal of the reaction product gases. A dip leg 118 is provided on the bottom of the dust catcher to return catalyst material within the 30 to 60 mesh size range to the reaction bed at a level below the upper level of the bed. The organic and chlorinating agents are fed to the bed through lines 120 and 121 through wind box 123. Oxygen is supplied to ring 124 via feed lines 124, 125, 126 and 127.

In the operation of this reactor gases fed to the wind box are passed through the distributor plate 102 via holes or orifices 107 and ring 122 at velocity sufficient to fluidize the bed, i.e., to expand the bed physically to heights 20 percent or greater than its height when no gases are being fed to the bed. The dust catcher or cyclone is operated during the reaction to provide for the trapping of blow-over catalyst in the 30 to 60 mesh size range. Periodically during the operation of a fluidized bed of this character, samples of catalysts may be removed and a screen analysis made to determine that (1) at least 75 percent of the bed or more is in the 30 to 60 mesh size range and that (2) of the total catalyst present in the bed at least 10 percent of it falls within the range of 50 to 60 mesh.

In conducting the process in accordance with this invention, aliphatic hydrocarbon containing from 1 to 4 carbon atoms and/or incompletely chlorinated derivatives thereof are fed in the gaseous phase along with oxygen and a chlorinating agent selected from the group consisting of HCl, $Cl_2$ and mixtures of HCl and $Cl_2$ to the oxychlorination fluidized bed reaction zone. Velocities of the gases entering the zone are maintained so that they are generally about 100 percent above the minimum fluidizing velocity for the size of the bed and the size and density of the particles contained therein. The bed contains typically between 75 to 85 percent by weight of catalyst particles in the size range of 30 to 60 mesh. The bed also contains at least 10 percent of these particles by weight in the range of 50 to 60 mesh. The upper portion of the reactor contains a cyclone separator designed to trap particles in the 30 to 60 mesh size range and is equipped with a dip leg extending into the fluid bed so that these particles may be continuously returned to the bed during the reaction to thereby maintain at least 75 percent of the bed in the desired size range. Operating in this manner, oxychlorinations of aliphatic hydrocarbons and their incompletely chlorinated derivatives in fluidized bed reactors are found to be satisfactory with respect to the burning encountered and good utilizations of the hydrocarbons and chlorinating agent are readily realized.

The present invention includes oxychlorination of aliphatic hydrocarbons having 1 to 4 carbon atoms, both saturated and unsaturated hydrocarbons being contemplated, and their incompletely chlorinated derivatives. The incompletely chlorinated derivatives may comprise chlorine addition and substitution products of aliphatics having 1 to 4 carbon atoms. Preferably, compounds fed to the system are chlorinatable aliphatic compounds having the formula:

$$C_nH_mX_r$$

where X represents chlorine, $n$ is an integer from 1 to 4, $m$ is an integer of at least 1 and the sum of $m+r$ is $2n+2$, $2n$ or $2n-2$. Generally, the feed comprises compounds in which the sum of $m+r$ is $2n+2$. When considerable recycle of products is performed, compounds in which the sum of $m+r$ is $2n-2$ are encountered as feed.

Products formed by the reactions occurring in the present invention are numerous and varied and depend upon the particular hydrocarbon and/or chlorohydrocarbon feed which is employed. Thus, when butane or propane are employed, more products are formed than when ethane or methane are used as feed. Saturated and unsaturated compounds are produced. When butane is used as the hydrocarbon feed, for example, methyl chloride, dichlorobutane, ethyl chloride, propyl chloride, ethane, ethylene, propane, propylene, methane and the like are produced. When propane, ethane or methane are employed, the variety of products decreases as the number of carbon atoms contained in the hydrocarbon and/or chlorohydrocarbon feed decreases. Similar results accrue when, in lieu of saturated feeds, materials such as ethylene, propylene and butene are fed.

Product recovery from systems conducted in accordance with this invention may be accomplished, for example, by indirect or direct condensation, carbon absorption trains, Dry Ice cold traps, and fractional distillation procedures or combinations of these procedures to separate the multitude of products present in the product gases emanating from these processes. Generally speaking, the higher the carbon content of the hydrocarbon feed employed, the more numerous the products formed and consequently the more intricate the recovery system necessary to separate product gases into their components.

To demonstrate the efficacy of applicants' process, reference is made to the following examples which demonstrate the critical nature of the particle size distribution of the catalyst.

EXAMPLE I

A carrier was utilized having the following particle size distribution characteristics:

Table I

FLOREX CARRIER—30–60 MESH
U.S. SIEVE SERIES

| Mesh Size: | Weight Percent |
|---|---|
| On 20 | — |
| 20–30 | 5.9 |
| 30–40 | 42.0 |
| 40–50 | 34.7 |
| 50–60 | 12.6 |
| 60–70 | 2.4 |
| <100 | 2.1 |

This carrier was loaded with catalyst by dissolving 29 pounds of $CuCl_2 \cdot 2H_2O$ and 15.2 pounds of KCl in 5.3 gallons of distilled water. The catalyst solution was then placed on the carrier shown above by dropping the solution on to these carrier particles as they were fluidized in a 10-inch internal diameter reactor having warm air blown up through it at a superficial linear velocity of 0.5 feet per second. The temperature of the bed was maintained at 220° F. during the dropwise addition of the catalyst until the 5.3 gallons of solution were added.

A fluid bed reactor shown diagrammatically in the drawing and comprising a nickel pipe 6 feet long and 6 inches in diameter was employed for the oxychlorination reaction of ethylene, chlorine and $O_2$. The lower 5 feet of the reactor was surrounded by a 10 inch diameter steel pipe having a reflux condenser attached thereto and containing circulating Dowtherm (A eutectic mixture of diphenyl and diphenyl oxide heat transfer manufactured by the Dow Chemical Company) therein. Strip heaters were placed around the bottom portion of the reactor to supply the necessary heat of reaction on start-up. Thermocouples were employed to measure the temperature of the reactor bed at the distribution plate and at levels 1, 2 and 3 feet above this plate. Ethylene was introduced into the reactor feed line. Chlorine was fed from a cylinder through a rotameter into the wind box through a 1 inch main feed line. Oxygen was introduced into the catalyst bed at a point located 14 inches above the distributor plate located above the wind box. A reactor feed of ethylene, chlorine, and oxygen in molar ratios of 1 to 2 to 1 were employed during the run. The pressure was varied during the reaction from 0 to 5 pounds per square inch gauge. The reaction temperatures in the fluidized bed were in the range of from 784° F. to 794° F. Contact time during the reaction was maintained at 9.8 seconds. Several runs were made utilizing these reactor conditions and the results are listed in Table Ia. The catalyst prepared as described above was employed in the catalyst bed.

*Table Ia*

[PRODUCT DISTRIBUTION, MOLE, PERCENT]

| | |
|---|---|
| $C_2Cl_4$ | 53.8 |
| $C_2HCl_3$ | 23.0 |
| $C_2H_4Cl_2$ | 2.6 |
| $C_2H_3Cl$ | 0.9 |
| $CHCl_3$ | 0.9 |
| $C_2H_2Cl_2$ | 5.1 |
| $C_2H_2Cl_4$ | 1.0 |
| $C_2HCl_5$ | 8.6 |
| $C_2Cl_6$ | 4.1 |
| | Percent |
| $C_2H_4$ Utilization | 94.1 |
| $C_2H_4$ Burned | 5.9 |
| $C_2H_4$ Unreacted | 0 |
| $Cl_2$ Utilized | 86.5 |

EXAMPLE II

The identical procedure was utilized to impregnate a Florex carrier 30 to 60 mesh which had the following mesh size distribution:

*Table II*

[FLOREX CARRIER—30–60 MESH]
[U.S. SIEVE SERIES]

| Mesh size | Weight percent |
|---|---|
| On 20 | 0.1 |
| 20–30 | 5.9 |
| 30–40 | 56.8 |
| 40–50 | 34.0 |
| 50–60 | 2.5 |
| 60–70 | 0.1 |
| <100 | 0.6 |

To this carrier, catalyst was added in the manner described above with respect to Example I and a 15-inch internal diameter reactor of the type described in Example I was utilized to manufacture perchloroethylene and trichloroethylene from ethylene, HCl and oxygen. Molar feed ratios of ethylene to HCl to $O_2$ of 1.0 to 3.14 to 1.74 were used. The temperature of the reaction zone was maintained at between 776° F. and 821° F. The fluidized bed velocities utilized were also maintained approximately the same as in Example I. When operating with this carrier, it was found that numerous problems occurred. The problems manifested themselves in excessively high temperatures occurring at the bottom of the fluidized bed and the oxygen ring was destroyed by excessively high temperatures occurring at the bottom of the reaction bed. In addition, ethylene feed was lost through burning presumably due to the excessive temperatures which occurred in the lower portion of the bed.

EXAMPLE III

To test the efficacy of the catalyst size range contemplated in accordance with the instant invention, two identical runs were made in the 15 inch reactor utilized above in Example II. The reactor was cooled by pouring a liquid organic material into the top of the reactor. Gases were fed to the reactor system by feeding the organic and chlorinating agent to the wind box and the oxygen through an oxygen ring up in the bed. In these two runs, ethylene dichloride, chlorine and oxygen were employed as feeds for purposes of manufacturing trichloroethylene and perchloroethylene. The catalyst utilized for each of the two runs listed in Table 3 were prepared in the manner described in Example I. In Run A, listed in Table III, the catalyst utilized was in the 30 to 300 mesh size range. A breakdown of the specific catalyst particles by mesh size distribution is shown in Table IV. Run B, in Table III was a run conducted with a 30 to 60 mesh catalyst particle size distribution in accordance with the instant invention. The analysis of this catalyst is shown in Table IV. Both runs were conducted and a comparison made of the products obtained, burning, and chloride utilizations to condensed organic, total organic, etc. The results of these runs are listed in detail in Columns A and B of Table III.

As can be readily seen from the above Examples, a substantial difference in the operation of a fluidized bed occurs when catalyst particles are employed which do not contain a 30 to 60 mesh catalyst particle size range, i.e., having at least 75 percent of the catalyst particles falling within this range and having also a distribution of particles within this range which contains at least 10 percent of the catalyst particles within the 50 to 60 mesh range size.

In Examples I and II, heat transfer co-efficients were calculated for the catalyst contained in both of them and it was found that the heat transfer co-efficient of the catalyst employed in Example I was approximately double the heat transfer co-efficient of the 30–60 mesh catalyst particle utilized in Example II. Thus, in Example II where excessive heat was found to occur in the bottom portion of the reactor to the extent that substantial damage to the oxygen ring occurred, in Example I no such damage was encountered. In addition, the excessive temperatures were not encountered in Example I and thus substantial reduction in the loss of feed materials caused by excessive oxidation at elevated temperatures was avoided.

While the invention has been described with reference to certain specific examples, it is, of course, to be understood that the invention is not to be limited thereby except insofar as appears in the accompanying claims.

Table III

| Reactor Conditions | A | B |
|---|---|---|
| Catalyst Mesh Size | 30/300 | 30/60 |
| Catalyst Age, Hours | 648 | 361 |
| Catalyst Bed Height, Feet | 8 | 8 |
| Reactor Size, I.D. (in.) | 15 | 15 |
| Reactor Cooling | (1) | (1) |
| Bottom Distributor | (2) | (2) |
| Reactor Pressure | Atm. | Atm. |
| Superficial Feed Velocity, ft./sec. | 0.58 | 0.57 |
| Halogen | $Cl_2$ | $Cl_2$ |
| Molar Feed Ratio (EDC/$Cl_2$/$O_2$) | 1.0/0.43/1.13 | 1.0/0.54/1.03 |
| Bed Temperature, °F. (10", 3', 7') | 806–806–800 | 815–804–739 |
| Crude Organic: | | |
|   Wt. percent Per+Tri | 85.7 | 84.8 |
|   P/T Ratio | 1.71 | 0.95 |
| Carbon Utilization To: | | |
|   Condensed Organic | 72.5 | 82.2 |
|   Total Organic | 78.9 | 86.0 |
|   Burning+$\Delta C$ | 21.1 | 14.0 |
| Total Chloride Utilization To: | | |
|   Condensed Organic | 86.6 | 90.4 |
|   Total Organic | 92.5 | 93.1 |
|   HCl+$\Delta Cl$ | 7.5 | 6.9 |
| Free Chloride Utilization To: Total Organic | 65.0 | 80.4 |
| Mole Percent EDC Utilized To: | | |
|   $C_2Cl_4$+$C_2HCl_3$ | 60.2 | 69.4 |
|   $C_2H_2Cl_4$+$C_2HCl_5$ | 2.3 | 4.3 |
|   $C_2H_2Cl_2$ | 9.7 | 10.0 |
|   $C_2H_3Cl_3$ | 1.2 | 1.0 |
|   Misc. $C_2$'s | 5.0 | 0.6 |
|   Total $C_2$'s | 78.4 | 85.3 |
|   $C_1$'s | 0.5 | 0.7 |
|   $\Delta C$+Burning | 21.1 | 14.0 |
| | 100.0 | 100.0 |

1 Organic pourback.
2 Flat-plate, $O_2$ ring.

Table IV

| Screen Size—Mesh Size | (20) | (30) | (40) | (40) | (60) | (70) | (100) | (140) | (200) | (270) | (325) | Pan |
|---|---|---|---|---|---|---|---|---|---|---|---|---|
| Wt. Percent: | | | | | | | | | | | | |
|   Run A | 0.5 | 0.3 | 8.8 | 18.0 | 14.5 | 11.2 | 15.7 | 13.4 | 0.01 | 11.5 | 2.9 | 5.1 |
|   Run B | 0.07 | 2.72 | 40.17 | 39.12 | 11.02 | 5.09 | 1.74 | 0.07 | | | | |

Chemical Analysis (wt. percent): Cl (8.0); Fe (0.33); Cu (4.3); K ((4.9); Ni (1.3).

We claim:

1. In a process for the oxychlorination of aliphatic hydrocarbons containing from 1 to 4 carbon atoms and their incompletely chlorinated derivatives, comprising reacting the material to be chlorinated, oxygen and a chlorinating agent selected from the group consisting of HCl and $Cl_2$ and mixtures of HCl and $Cl_2$ in a fluidized bed of oxychlorination catalyst particles maintained at an elevated temperature the improvement comprising regulating the particle size distribution of the catalyst particles contained within the fluidized bed during the reaction to provide in the bed at least 75 percent by weight of the catalyst particles in distribution of sizes ranging between 30 to 60 mesh, said particles containing at least 10 percent by weight of the particles in the range of 50 to 60 mesh.

2. The method of claim 1 wherein the catalyst particles in the size range of 30 to 60 mesh and containing at least 10 percent by weight of particles in the 50 to 60 mesh range size are continuously fed to the fluidized bed to provide the 75 percent by weight of catalyst bed composition at all times.

3. In a process for the oxychlorination of aliphatic hydrocarbons containing from 1 to 4 carbon atoms and their incompletely chlorinated derivatives, comprising reacting the material to be chlorinated, oxygen and a chlorinating agent selected from the group consisting of HCl, $Cl_2$ and mixtures of HCl and $Cl_2$ in a fluidized bed containing catalyst particles wherein the bed is maintained in a fluidized condition and at a temperature between 400 to 1200° F. during reaction, the improvement comprising regulating the catalyst particles contained within that bed to maintain at least 75 percent of the bed by weight with catalyst particles ranging in size from 30 to 60 mesh while providing in the range of 30 to 60 mesh catalyst particle range a weight of at least 10 percent of the particles in the range of 50 to 60 mesh.

4. The method of claim 3 wherein the material to be chlorinated is ethylene, the chlorinating agent is HCl and the temperature is regulated between 400 to 650° F. to thereby produce 1,2-dichloroethane.

5. The method of claim 3 wherein the material to be chlorinated is 1,2-dichloroethane, the chlorinating agent is chlorine and the temperature is maintained between 700° F. to 900° F. to thereby produce perchloroethylene and trichloroethylene.

References Cited by the Examiner

UNITED STATES PATENTS

| | | | |
|---|---|---|---|
| 2,575,167 | 11/1951 | Fontana et al. | 260—659 X |
| 2,644,846 | 7/1953 | Johnson et al. | 260—659 X |
| 2,783,286 | 2/1957 | Reynolds | 260—659 X |
| 2,836,577 | 6/1958 | Cook et al. | 260—659 X |
| 2,957,924 | 10/1960 | Heiskell et al. | 260—662 |

FOREIGN PATENTS

| | | |
|---|---|---|
| 631,451 | 8/1963 | Belgium. |
| 1,291,890 | 3/1962 | France. |

OTHER REFERENCES

Perry: Chemical Engineers Handbook, 4th ed., New York, 1963, section 21, p. 51.

LEON ZITVER, *Primary Examiner.*

K. V. ROCKEY, *Assistant Examiner.*

UNITED STATES PATENT OFFICE

CERTIFICATE OF CORRECTION

Patent No. 3,296,319  January 3, 1967

Lester E. Bohl et al.

It is hereby certified that error appears in the above numbered patent requiring correction and that the said Letters Patent should read as corrected below.

Column 3, line 42, for "124" read -- 122 --; columns 7 and 8, Table IV, in the heading, fifth column, for "40" read -- 50 --.

Signed and sealed this 13th day of August 1968.

(SEAL)
Attest:

Edward M. Fletcher, Jr.
Attesting Officer

EDWARD J. BRENNER
Commissioner of Patents